T. H. ALFREDS.
ANTIFRICTION BEARING.
APPLICATION FILED SEPT. 7, 1915.
1,187,695.
Patented June 20, 1916.
2 SHEETS—SHEET 1.
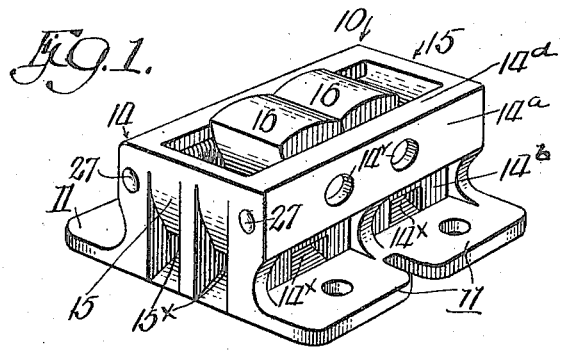
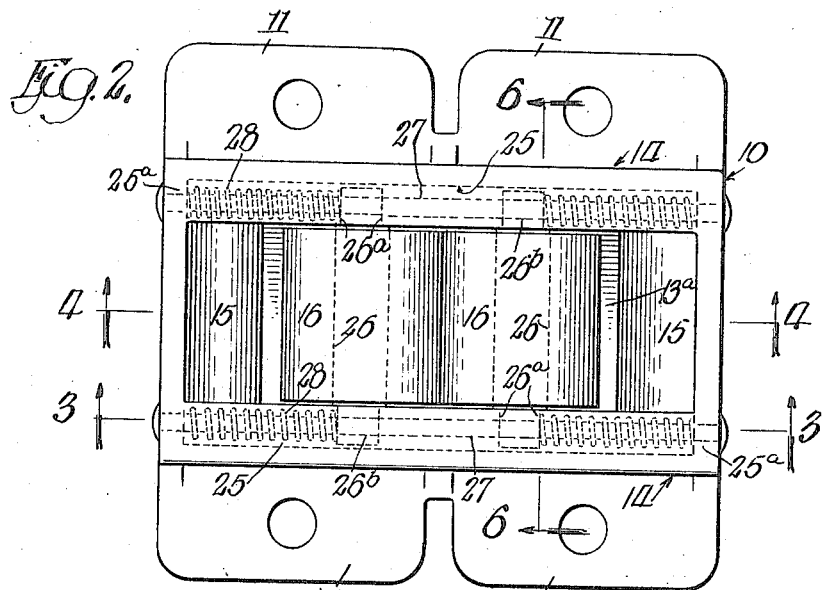
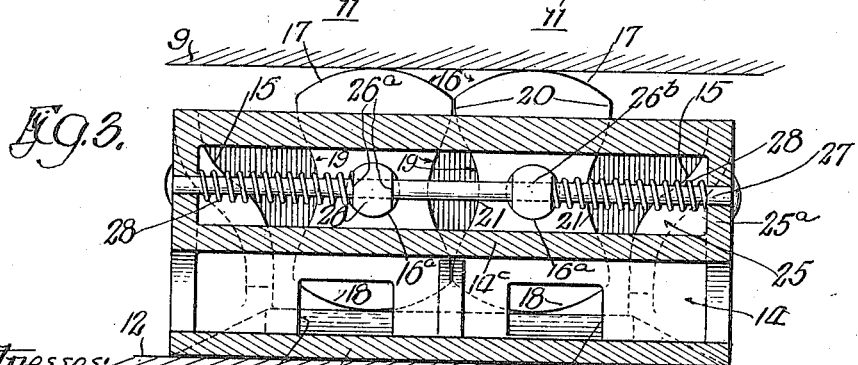
Witnesses:
Inventor
Torris H. Alfreds T. H. ALFREDS.
ANTIFRICTION BEARING.
APPLICATION FILED SEPT. 7, 1915.
1,187,695.
Patented June 20, 1916.
2 SHEETS—SHEET 2.
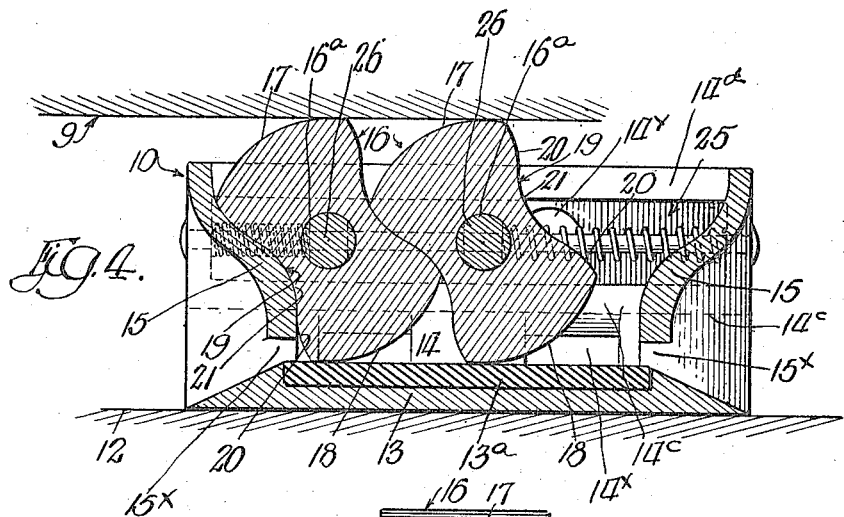
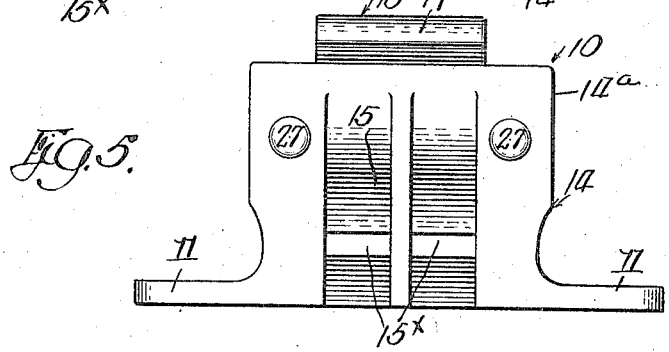
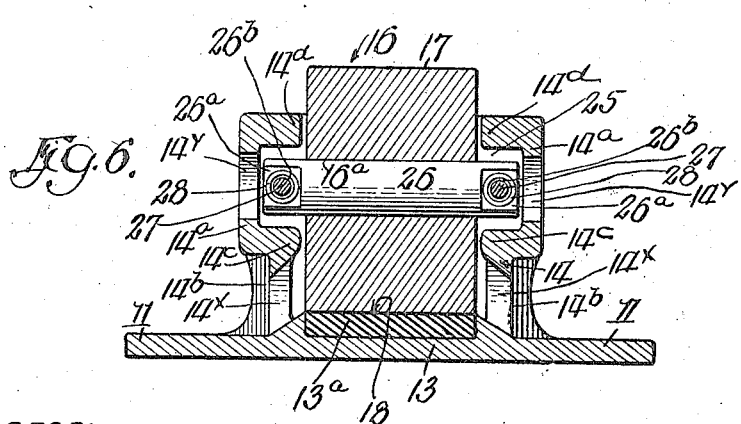
Witnesses:
Karl N. Doll
Ethel A. Krulewich
Inventor
Torris H. Alfreds
by Brown & Phillips, Attys

UNITED STATES PATENT OFFICE.

TORRIS H. ALFREDS, OF CHICAGO, ILLINOIS, ASSIGNOR TO ALBERT G. WELCH, OF CHICAGO, ILLINOIS, TRUSTEE UNDER THE LAST WILL OF EDWIN S. WOODS, DECEASED.

ANTIFRICTION-BEARING.

1,187,695.   Specification of Letters Patent.   Patented June 20, 1916.

Application filed September 7, 1915. Serial No. 49,180.

*To all whom it may concern:*

Be it known that I, TORRIS H. ALFREDS, a citizen of the United States, and a resident of Chicago, in the county of Cook and State of Illinois, have invented certain new and useful Improvements in Antifriction-Bearings; and I do hereby declare that the following is a full, clear, and exact description thereof, reference being had to the accompanying drawings, and to the letters of reference marked thereon, which form a part of this specification.

This invention relates to improvements in anti-friction bearings and consists of the matters hereinafter described and more particularly pointed out in the appended claims.

As illustrated herein, the antifriction bearing is designed more particularly for use as a railway car side bearing and is adapted to be interposed between the body and truck bolsters of the car, and in this particular instance is applied or attached to the truck bolster, but as will be apparent, said antifriction bearing may as readily be attached to and suspended from the body bolster.

The novel features and advantages of my improved antifriction bearing will appear as I proceed with my specification.

In the drawings: Figure 1 is a perspective view of my improved anti-friction bearing. Fig. 2 is a top plan view thereof on an enlarged scale. Fig. 3 is a view representing a longitudinal section through the bearing in a plane indicated by the line 3—3 of Fig. 2 and illustrates the antifriction elements in their normal upright position. Fig. 4 is a view representing a longitudinal section therethrough, the plane of the section being indicated by the line 4—4 of Fig. 2 and illustrates the anti-friction elements in the position they assume, after they have been oscillated from their normal position as in the transmission of load between the body and truck bolsters. Fig. 5 is a view in end elevation of my improved anti-friction bearing. Fig. 6 is a transverse sectional view through the antifriction bearing, the plane of the section being indicated by the line 6—6 of Fig. 2.

Referring now to that embodiment of my invention as illustrated in the accompanying drawings:—9 indicates the body bolster of a railroad car and 10 indicates the bearing casing which is adapted to contain the anti-friction elements and which is attached by means of laterally extending ears 11 to the truck bolster 12 of the car. Said shell 10 is somewhat elongated and is rectangular in form and has a bottom wall 13, upright side walls 14 and reversely curved end walls 15, the purpose of which will more fully appear as I proceed with my specification. In the bottom wall 13 is provided a shallow rectangular recess in which is located a wear plate 13ª.

16, 16 indicate the antifriction elements which as illustrated herein, consist of rockers and are so located within the casing as to have direct bearing engagement on the wear plate 13ª. Any number of said elements may be employed within a suitable casing, the said number depending upon the load to be transmitted between the body and truck bolsters and in this particular instance, two of such anti-friction elements are shown. The said antifriction elements are similar to those illustrated in an application for Letters Patent filed by Arnold A. Weigel on July 3d, 1915, which application bears Serial No. 37,932.

As in the application above referred to, said elements are segments of cylinders and have top and bottom cylindric bearing surfaces 17 and 18, respectively.

19 indicates the sides of said rockers or antifriction elements. Each of said sides are curved inwardly toward the vertical central axial plane of the antifriction element from the lines in which the top and bottom cylindric bearing surfaces 17 and 18 terminate as indicated at 20, in such manner that as the adjacent element rocks, the like line of said element will ride upon, without binding against the said side as is illustrated in Fig. 4. By forming the intermediate reverse curve 21 of the same radius, when the said antifriction elements have rocked through the full amplitude of their oscillation, the side of one element will engage and lock against the adjacent side of the other element, thus eliminating and preventing further movement of the two elements. In addition to the locking engagement of the elements themselves, which limit and determine the amplitude of their oscillation, that side of the element next to the reverse curved end wall 15, will come to bear against substantially the full height of said end wall, the contour of which is such as will permit such bearing engagement therewith. Means are provided for returning said antifriction elements to their normal upright position at the center of the casing after they have been released from load transmission and such means are as follows.

The top part 14ª of each of the side walls 14 is spaced outwardly from the plane of the bottom part 14ᵇ of said side walls and is connected thereto by means of a horizontal flange 14ᶜ. The top part 14ª, and each of the side walls has an inwardly projecting horizontal flange 14ᵈ, the inner lateral edge of which is in the plane of the like edge of the flange 14ᶜ, said flanges being adapted to receive the end thrust of the antifriction elements. This construction provides longitudinal channels or compartments 25, which extend the full length of the casing, the median line of said channels or compartments being located in the plane of the axes of the antifriction elements.

Each antifriction element is provided at its axis with a concentrically arranged aperture 16ª, which is adapted to receive a shaft or axle 26. Each shaft is of such length as to project outwardly beyond the ends of its associated antifriction element and extends at its end into each of the channels or chambers 25 formed in the side wall 14. The ends of each shaft are flattened at diametrically opposite sides as indicated at 26ª and through the flattened sides thereof is formed a diametrically extending aperture 26ᵇ.

27, 27 indicate longitudinally extending bars or rods which are arranged to extend through the aperture 26ᵇ of the flattened ends of the shafts and through alined openings in the end wall 25ª of the channels or compartments 25, said rods being upset at their ends against said end walls 25ª to prevent displacement thereof.

28, 28 indicate expansion coiled springs which surround that part of the rods 27 between the end walls 25ª of the compartments or channels 25 and the flattened sides of the ends of said shaft, said springs, of course, engaging at their ends with said end walls and shafts respectively.

In the top part 14ª of the side walls are provided apertures 14ʸ for the introduction of the shafts 26 into and through the associated antifriction element.

From the foregoing description it is apparent that when the antifriction elements are rocked toward one end of the casing as when transmitting load under the action of a horizontal oscillation between the body and truck bolsters of the car, said elements will rotate about and carry with them in a horizontal plane, their associated shafts or axles 26. The ends of said shafts being mounted upon the longitudinally extending rods 27 before mentioned, will move in guided engagement therewith and compress the springs thereon in that end of the casing toward which said elements are rocking. The springs 28 upon the opposite end of said rods will expand so as to prevent any longitudinal displacement between the antifriction elements. When the antifriction elements have been released from load which will occur when the body and truck bolsters are again oscillated to bring said bolsters into vertical alinement, the springs 28 which will have been compressed, will tend to expand back toward their normal position and will center said elements in the casing, this, of course, occurring when the expansive tendency of the springs in opposite ends of the casing are equalized.

It will also be apparent that with the shafts or axle of the elements being guided in a straight horizontal line parallel with the bottom wall of the casing, the said elements are held in a position wherein their bottom cylindric surfaces will always be in contact with the wear plate 13ª. This construction not only locks the antifriction elements in operative position within the casing, but also prevents a rattling or jarring of the said elements and provides a quiet, easy working bearing.

In the bottom part 14ᵇ of the side walls are provided ventilation openings 14ˣ and in the reverse curved end walls 15 are provided similar ventilation openings 15ˣ, the purpose of which is to prevent the trapping of grit or dust within the casing.

While in describing my invention I have referred to certain details of mechanical construction and arrangement of parts, I wish it to be understood that I do not limit myself thereto except as is pointed out in the appended claims.

I claim as my invention:—

1. In combination with a casing having a bottom and end walls, an antifriction element in said casing adapted to bear on said bottom wall, a shaft concentrically mounted in said antifriction element and projecting beyond the ends thereof, means providing a sliding bearing guide for said shaft said means preventing rotative movement of said shaft and springs on said shaft guiding means intermediate said shaft and end walls of the casing.

2. In combination with a casing having a bottom wall and end walls, antifriction rocking elements in said casing adapted to rock on said bottom wall, shafts concentrically mounted in said antifriction elements, longitudinally extending rods, upon which said shafts have a guided sliding movement and springs mounted on said rods intermediate said shafts and end walls of said casing.

3. In combination with a casing having a bottom, side and end walls, said side walls having longitudinally extending channels therein, antifriction rocking elements in said casing adapted to rock on said bottom wall, shafts concentrically mounted in said antifriction element, the ends of said shafts being apertured and extending into the channels in the side walls of the casing, longitudinally extending rods in said channels, said rods being fixed in the end wall of said casing and extending through the apertures in said shaft ends and expansion coiled springs mounted on said rods intermediate said shafts and end walls.

4. In combination with a casing having bottom, side and end walls, said side walls having longitudinally extending channels therein, antifriction rocking elements in said casing adapted to rock on said bottom wall, shafts concentrically mounted in said antifriction elements, the ends of said shafts having diametrically opposite flattened sides through which are provided diametrically extending apertures, said flattened ends of said shafts extending into the channels in said side walls, longitudinally extending rods in said channels, said rods being fixed at their ends in the end walls of said casing and extending through the apertures in the flattened ends of said shafts, and coiled springs mounted on said rods intermediate the flattened ends of said shafts and the end walls of said casing.

5. An antifriction bearing comprising a casing having a bottom and end walls, a plurality of closely spaced rocking antifriction elements located in said casing and having top and bottom bearing surfaces, one of which is adapted to have a rocking movement on the bottom wall of the casing, through a predetermined angle, said rocking elements having their adjacent sides constructed to provide interacting bearing surfaces between said elements, said bearing surfaces being so constructed that the side of one element bears against the proximate side of the adjacent element throughout substantially the full amplitude of movement of said elements, non-rotative shafts located concentrically with respect to the axis of said top and bottom bearing surfaces of the rocking elements, but movable in a horizontal plane therewith, means providing a sliding bearing for the outer ends of said shafts, said means preventing a vertical movement of the antifriction elements relative to said casing bottom wall and springs mounted on said means which are interposed between a fixed part of the casing and the ends of said shafts.

In testimony, that I claim the foregoing as my invention, I affix my signature in the presence of two witnesses, this 31st day of August A. D. 1915.

TORRIS H. ALFREDS.

Witnesses:
 KARL W. DOEL,
 ETHEL A. KRULEWICH.

Copies of this patent may be obtained for five cents each, by addressing the "Commissioner of Patents, Washington, D. C."